(12) United States Patent
Naughton

(10) Patent No.: US 8,753,048 B2
(45) Date of Patent: Jun. 17, 2014

(54) HOLE SAW

(75) Inventor: Michael Naughton, Oconomowoc, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 169 days.

(21) Appl. No.: 13/416,128

(22) Filed: Mar. 9, 2012

(65) Prior Publication Data
US 2012/0237306 A1 Sep. 20, 2012

Related U.S. Application Data

(60) Provisional application No. 61/451,878, filed on Mar. 11, 2011.

(51) Int. Cl.
*B23B 51/05* (2006.01)
(52) U.S. Cl.
USPC ............................. 408/81; 408/68; 408/204
(58) Field of Classification Search
USPC ................. 408/204, 206, 68, 79, 80, 81, 82
See application file for complete search history.

(56) References Cited

U.S. PATENT DOCUMENTS

| | | | | |
|---|---|---|---|---|
| 1,231,551 A | * | 7/1917 | Alexander | 408/200 |
| 4,203,692 A | * | 5/1980 | Jensen | 408/96 |
| 4,749,315 A | * | 6/1988 | Mills | 408/209 |
| 5,743,682 A | * | 4/1998 | Chaney, Sr. | 408/79 |
| 6,305,885 B1 | * | 10/2001 | Linthicum | 408/1 R |
| 6,409,437 B1 | * | 6/2002 | Metzger | 408/80 |
| 2010/0303567 A1 | | 12/2010 | Thomas | |

FOREIGN PATENT DOCUMENTS

| | | | | |
|---|---|---|---|---|
| JP | 2001009618 A | * | 1/2001 | |
| JP | 2009148872 A | * | 7/2009 | |
| NL | 63762 C | * | 7/1947 | |

OTHER PUBLICATIONS

International Search Report and Written Opinion for Application No. PCT/US2012/028427 dated Sep. 17, 2012 (11 pages).

\* cited by examiner

*Primary Examiner* — Daniel Howell
*Assistant Examiner* — Nicole N Ramos
(74) *Attorney, Agent, or Firm* — Michael Best & Friedrich LLP

(57) ABSTRACT

A hole saw that includes a saw body including a circular cutting edge having a cutting edge diameter, and the saw body is coupled to a guide member for rotation with the guide member. A pilot is coupled to the guide member for movement relative to the guide member and the saw body, and the pilot includes an outer guide surface having a diameter that increases in a direction from a second end portion of the guide member toward a first end portion of the guide member. The pilot is coupled to the guide member such that at least a portion of the outer guide surface extends past the circular cutting edge of the saw body in a direction from the first end portion of the guide member toward the second end portion of the guide member.

8 Claims, 3 Drawing Sheets

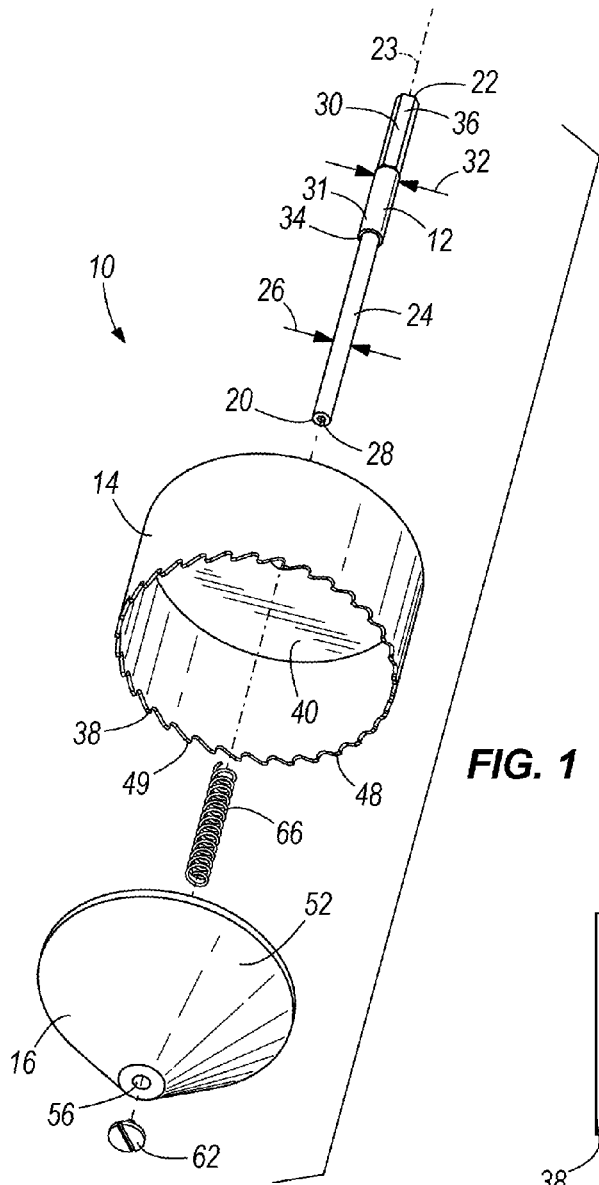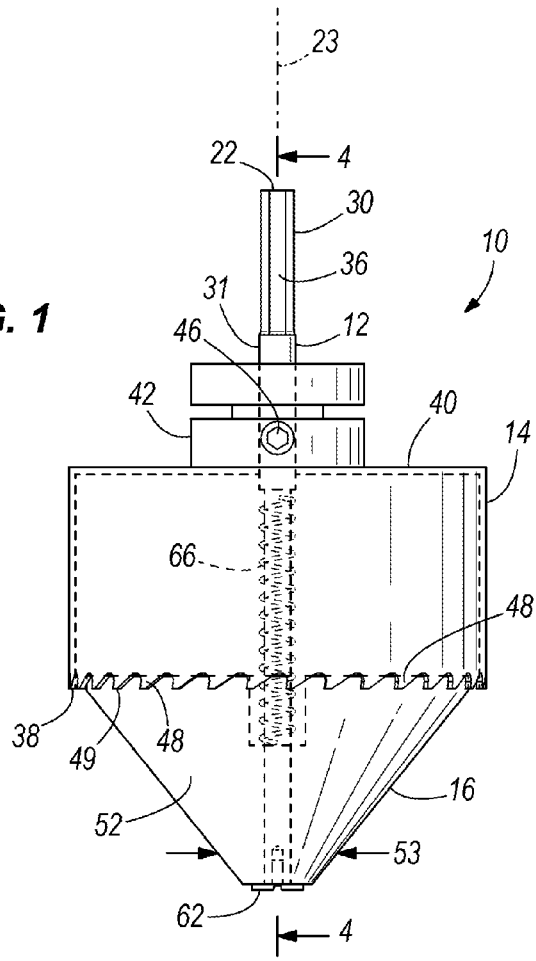
FIG. 1
FIG. 2

HOLE SAW

CROSS REFERENCE TO RELATED APPLICATIONS

This application claims priority to U.S. Provisional Patent Application No. 61/451,878, filed Mar. 11, 2011, the entire contents of which are hereby incorporated by reference herein.

BACKGROUND OF THE INVENTION

The present invention relates to hole saws.

Hole saws typically include a pilot bit and a saw body. The pilot bit includes an arbor at a first end portion of the pilot bit and a drill bit at a second end portion of the pilot bit. The arbor is configured to be received in a chuck of a rotary power tool, such as a drill. The drill bit is often a spiral drill bit. The saw body is coupled to the pilot bit for rotation with the pilot bit and the saw body includes a circular cutting edge. The saw body is coupled to the pilot bit such that the cutting edge is above at least a portion of the drill bit so that the drill bit cuts into a work-piece first to establish a relatively small pilot hole and then the circular cutting edge cuts a relatively large hole into the work-piece.

SUMMARY OF THE INVENTION

In one embodiment, the invention provides a hole saw configured for use with a rotary power tool. The hole saw includes a guide member including a first end portion and a second end portion. The first end portion is configured to couple the hole saw to the rotary power tool. The hole saw further includes a saw body including a circular cutting edge having a cutting edge diameter, and the saw body is coupled to the guide member for rotation with the guide member. A pilot is coupled to the guide member for movement relative to the guide member and the saw body in a direction from the second end portion of the guide member toward the first end portion of the guide member, and the pilot includes an outer guide surface having a diameter that increases in the direction from the second end portion of the guide member toward the first end portion of the guide member. The pilot is coupled to the guide member such that at least a portion of the outer guide surface extends past the circular cutting edge of the saw body in a direction from the first end portion of the guide member toward the second end portion of the guide member.

In another embodiment the invention provides a hole saw operable to cut an aperture having a first diameter into a work-piece, and the work-piece has a guide aperture having a second diameter less than the first diameter. The hole saw includes a guide member including a first end portion, a second end portion, and a longitudinal axis that extends centrally through the guide member through the first end portion and the second end portion. The hole saw further includes a saw body including a circular cutting edge having a cutting edge diameter, and the saw body is coupled to the guide member for rotation with the guide member about the longitudinal axis of the guide member. A pilot is coupled to the guide member for movement relative to the guide member and the saw body in a direction from the second end portion of the guide member toward the first end portion of the guide member parallel to the longitudinal axis of the guide member, and the pilot includes an outer guide surface having a diameter that increases in the direction from the second end portion of the guide member toward the first end portion of the guide member parallel to the longitudinal axis of the guide member. The pilot is coupled to the guide member such that the pilot is configured to be received in the guide aperture of the work-piece to position the circular cutting edge of the saw body concentric with the guide aperture.

Other aspects of the invention will become apparent by consideration of the detailed description and accompanying drawings.

BRIEF DESCRIPTION OF THE DRAWINGS

FIG. 1 is an exploded view of a hole saw according to one embodiment of the invention.

FIG. 2 is a side view of the hole saw of FIG. 1.

Figure 4:
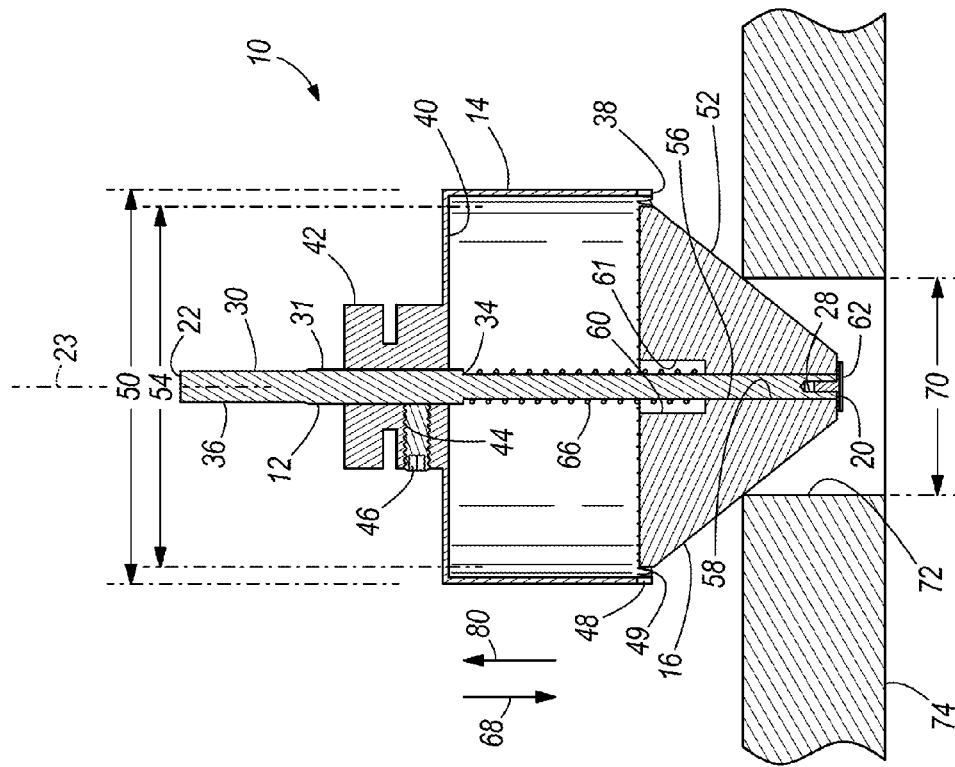
FIG. 4 is a cross-sectional view of the hole saw of FIG. 1 taken along lines 4-4 in FIG. 2 showing the hole saw in a first position relative to a work-piece.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIG. 1 illustrates a hole saw 10 according to one embodiment of the invention. The hole saw 10 includes a guide 12, a saw body 14, and a pilot 16. The guide 12 includes a first end 20 and a second end 22. A longitudinal axis 23 of the guide 12 extends centrally through the guide 12 and through the first end 20 and the second end 22. A first end portion 24 of the guide 12 is adjacent the first end 20. The first end portion 24, having a first diameter 26, extends from the first end 20 toward the second end 22. An aperture 28, which is threaded in the illustrated embodiment, is formed in the first end 20. A second end portion 30 of the guide 12 is adjacent the second end 22. The second end portion 30 includes a generally cylindrical portion 31, having a second diameter 32 greater than the first diameter 26. The different diameters 26, 32 form a ledge 34 that extends around the guide 12 between the first portion 24 and the second portion 30. The second end portion 30 further includes a non-round portion 36, which is hex-shaped in the illustrated embodiment to form an arbor of the hole saw 10. The arbor 36 is configured to be received in a chuck of a rotary power tool, such as a drill, to couple the hole saw 10 to the power tool so that the hole saw 10 can be rotated by the tool during operation. In other embodiments, the non-round portion or arbor 36 can extend to the ledge 34 to facilitate coupling the saw body 14 to the guide 12 for rotation with the guide 12 about the axis 23.

Referring to FIGS. 1 and 2, the saw body 14 is generally cylindrical and includes an open end 38 and a closed end 40. A collar 42 extends from an exterior of the closed end 40. The collar 42 includes an aperture 44 (FIGS. 4 and 5) that receives a fastener 46, which is a screw in the illustrated embodiment. The screw 46 is used to couple and uncouple the saw body 14 from the guide 12 so that a different saw body can be coupled to the guide 12. The open end 38 of the saw body 14 includes cutting teeth 48 that together define a circular cutting edge 49 of the saw body 14. The circular cutting edge 49 has a cutting edge diameter 50 (FIG. 4) that generally defines a hole size that may be cut with the hole saw 10. In illustrated embodiment, the cutting teeth 48 extend generally continuously around the cutting edge 49. In other embodiments, the cutting edge may include other suitable numbers of cutting teeth spaced around the cutting edge. For example, in one embodiment, the cutting edge may be defined by about six cutting teeth evenly spaced around the cutting edge. Such an embodiment may be particularly suited for metal drilling applications. In yet other embodiments, the cutting edge may include only a single cutting tooth.

With continued reference to FIGS. 1 and 2, the pilot 16 include a frusto-conical outer guide surface 52. The guide surface 52 has a diameter 53 that increases in a direction from the first end 20 of the guide 12 toward the second end 22 of the guide 12 along the axis 23. The guide surface 52 has a maximum diameter 54 (FIG. 4) that is less than the diameter 50 of the cutting edge 49. The maximum diameter 54 of the guide surface 52 is less than the diameter 50 of the cutting edge 49 so that the pilot 16 can move into and out of the saw body 14 through the open end 38 of the saw body 14.

Referring to FIG. 4, an aperture 56 extends through the pilot 16 along the longitudinal axis 23. The aperture 56 is concentric with the guide 12 and includes a first portion 58 having a first diameter and a second portion 60 having a second diameter greater than the first diameter. The second portion 60 forms a recess 61 in the pilot 16. The guide 12 extends through the aperture 56 and the threaded aperture 28 of the guide 12 receives a fastener 62, which is a screw in the illustrated embodiment, to couple the pilot 16 to the guide 12. Although in illustrated embodiment, a screw is used to removably couple the pilot 16 and the guide 12, in other embodiments, other types of fasteners or fastening devices can be used. For example, in one embodiment, a fastener that uses only a quarter-turn can be used to couple the pilot 16 and the guide 12. In yet other embodiments, the pilot 16 and the guide 12 may not be removably coupled. In the illustrated embodiment, the guide 12 and the pilot 16 are removably coupled so that the user may use a different guide 12 or saw body 14 with the guide 12.

A biasing member 66, which is a coil spring in the illustrated embodiment, is used to bias the pilot 16 with respect to the saw body 14 along the guide 12 in the direction of arrow 68 of FIG. 4 (i.e., in a direction from the second end 22 of the guide 12 toward the first end 20 of the guide 12). The guide 12 extends through the spring 66 and one end of the spring 66 is received in the recess 61 formed by the aperture 56 of the pilot 16 and the other end of the spring 66 acts against the ledge 34 of the guide 12. The fastener 62 retains the pilot 16 coupled to the guide 12 against the bias of the spring 66 so that that pilot 16 remains coupled to the guide 12 and does not slide off of the guide 12.

Figure 5:
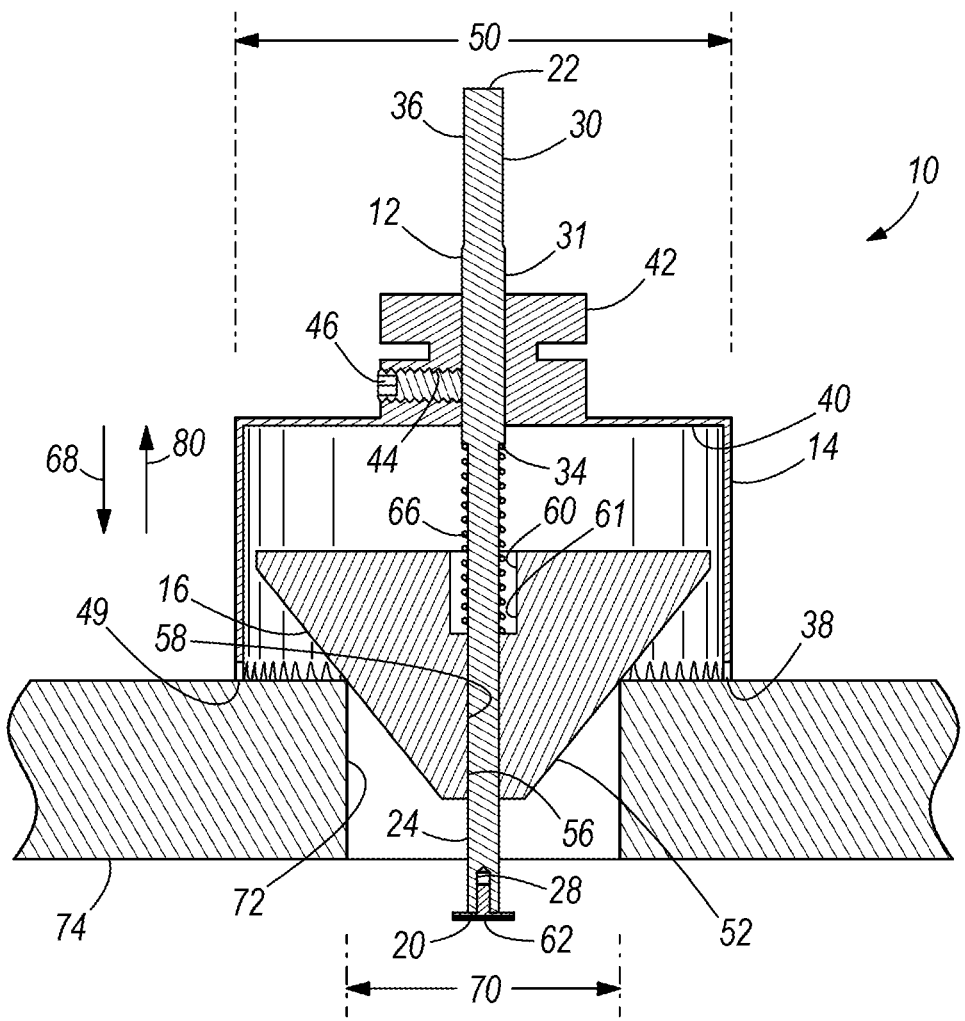
FIG. 5 is a cross-sectional view of the hole saw of FIG. 1 taken along lines 4-4 in FIG. 2 showing the hole saw in a second position relative to the work-piece.

Referring to FIGS. 4 and 5, in operation, the hole saw 10 is used to increase the size or a diameter 70 of an already existing aperture or guide hole 72 in a work-piece 74 to a second or larger diameter approximately the diameter 50 of the cutting edge 49. A user inserts the second portion 30 or arbor of the guide 12 into a chuck or the like of a rotary power tool, such as a drill. Then, the user inserts the guide 12 and the pilot 16 into the aperture 72 of the work-piece 74, as illustrated in FIG. 4. The pilot 16 is coupled to the guide 12 so that the pilot 16 is also inserted into the aperture 72 with the guide 12. The outer guide surface 52 contacts the work-piece 74 and the frusto-conical outer guide surface 52 automatically positions the axis 23 of the guide 12 concentric with the aperture 72, which then positions the cutting edge 49 of the saw body 14 concentric with the aperture 72.

Figure 3:
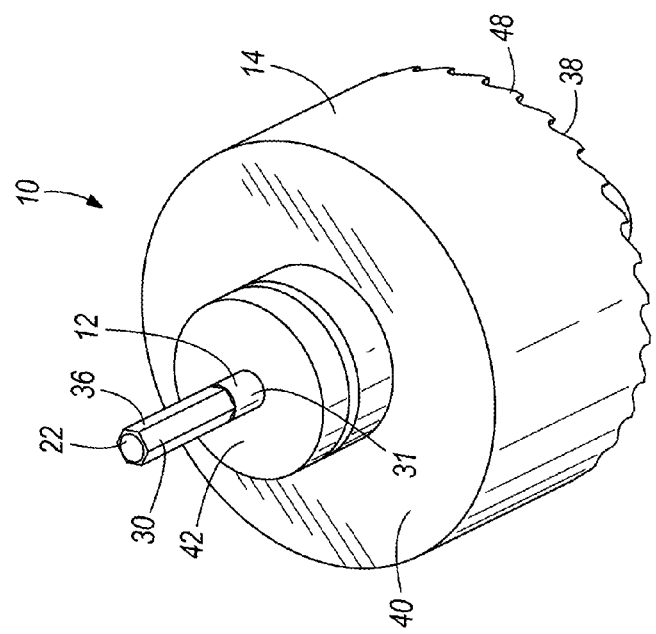
FIG. 3 is a perspective view of the hole saw of FIG. 1.

The power tool is used to rotate the guide 12, which rotates the saw body 14. The user presses on the power tool to move the cutting edge 49 of the open end 38 of the saw body 14 in the direction of arrow 68 against the bias of the spring 66 in order to move the cutting edge 49 toward the work-piece 74. Meanwhile, as illustrated in FIG. 5, the outer surface 52 of the pilot 16 maintains the position of the saw body 14 with respect to the existing aperture 72 such that the cutting edge 49 of the saw body 14 remains concentric with the existing aperture 72. The user continues to move the cutting edge 49 of the saw body 14 in the direction of arrow 68 until the saw body 14 cuts an aperture through the work-piece 74 approximately the diameter 50 of the cutting edge 49. During cutting, the pilot 16 moves in the direction of arrow 80 with respect to the saw body 14 and into the saw body 14. After cutting, the spring 66 moves the pilot 16 back to the starting position illustrated in FIG. 3 and the fastener 62 retains the pilot 16 coupled to the guide 12 against the bias of the spring 66.

Thus, the invention provides, among other things, a hole saw that can be used to increase the size of an existing hole in a work-piece. Various features and advantages of the invention are set forth in the following claims.

What is claimed is:

1. A hole saw configured for use with a rotary power tool, the hole saw comprising:
   a guide member including a first end portion, a second end portion, and a generally cylindrical portion between the first end portion and the second end portion that forms a ledge, the first end portion configured to couple the hole saw to the rotary power tool;
   a saw body including a collar and a circular cutting edge having a cutting edge diameter, the saw body coupled to the guide member at the generally cylindrical portion for rotation with the guide member by the collar;
   a pilot coupled to the guide member for movement relative to the guide member and the saw body in a direction from the second end portion of the guide member toward the first end portion of the guide member, the pilot including an outer guide surface having a diameter that increases in the direction from the second end portion of the guide member toward the first end portion of the guide member; and
   a biasing member that biases the pilot in the direction from the first end portion of the guide member toward the second end portion of the guide member;
   wherein the pilot is coupled to the guide member such that at least a portion of the outer guide surface extends past the circular cutting edge of the saw body in a direction from the first end portion of the guide member toward the second end portion of the guide member;
   wherein the pilot includes a recess concentric with the guide member, wherein the biasing member extends into the recess and contacts the pilot to bias the pilot in the direction from the first end portion of the guide member toward the second end portion of the guide member;
   wherein the biasing member contacts the ledge to bias the pilot in the direction from the first end portion of the guide member toward the second end portion of the guide member; and
   wherein the ledge has a diameter approximately equal to the generally cylindrical portion.

2. The hole saw of claim 1, and further comprising a fastener that couples the pilot to the guide member.

3. The hole saw of claim 2, wherein the guide member includes an aperture adjacent the second end portion of the guide member, wherein the aperture receives the fastener to couple the pilot to the guide member.

4. The hole saw of claim 3, wherein the fastener includes a screw.

5. The hole saw of claim 1, and further comprising a fastener that couples the pilot to the guide member, wherein the fastener retains the pilot coupled to the guide member against the bias of the biasing member.

6. The hole saw of claim 1, wherein the saw body is removably coupled to the guide member.

7. The hole saw of claim 6, wherein the saw body includes a collar and a fastener that extends through the collar to removably couple the saw body to the guide member.

8. The hole saw of claim 1, wherein the outer guide surface of the pilot has a maximum diameter less than the cutting edge diameter of the circular cutting edge.

* * * * *